United States Patent [19]

Rømer

[11] Patent Number: 4,524,806
[45] Date of Patent: Jun. 25, 1985

[54] PRESSURE VALVE FOR A COMPRESSOR

[75] Inventor: Bendt W. Rømer, Sønderborg, Denmark

[73] Assignee: Danfoss A/S, Nordborg, Denmark

[21] Appl. No.: 576,733

[22] Filed: Feb. 3, 1984

[30] Foreign Application Priority Data

Feb. 19, 1983 [DE] Fed. Rep. of Germany ....... 3305791

[51] Int. Cl.³ .............................................. F16K 15/16
[52] U.S. Cl. .................................... 137/856; 137/857
[58] Field of Search ............... 137/843, 855, 856, 857, 137/527

[56] References Cited

U.S. PATENT DOCUMENTS 1,163,716 12/1915 Van Der Putten ................. 137/855
2,118,356 5/1938 Money ................................ 137/856
2,970,608 2/1961 Doeg ................................. 137/851
4,201,241 5/1980 Schertler ............................ 137/527
4,257,457 3/1981 Namura et al. ..................... 137/856

Primary Examiner—Martin P. Schwadron
Assistant Examiner—Sheri Novack
Attorney, Agent, or Firm—Wayne B. Easton

[57] ABSTRACT

A pressure valve for a compressor of the hermetically encapsulated type. The valve includes a valve plate with a valve seat and upstanding pins on which at least one catch plate is placed to limit the stroke of a closing member formed by a valve leaf spring. The valve seat is disposed in an elongated depression of the valve plate and the pins are formed on an insert spring into the recess.

9 Claims, 1 Drawing Figure

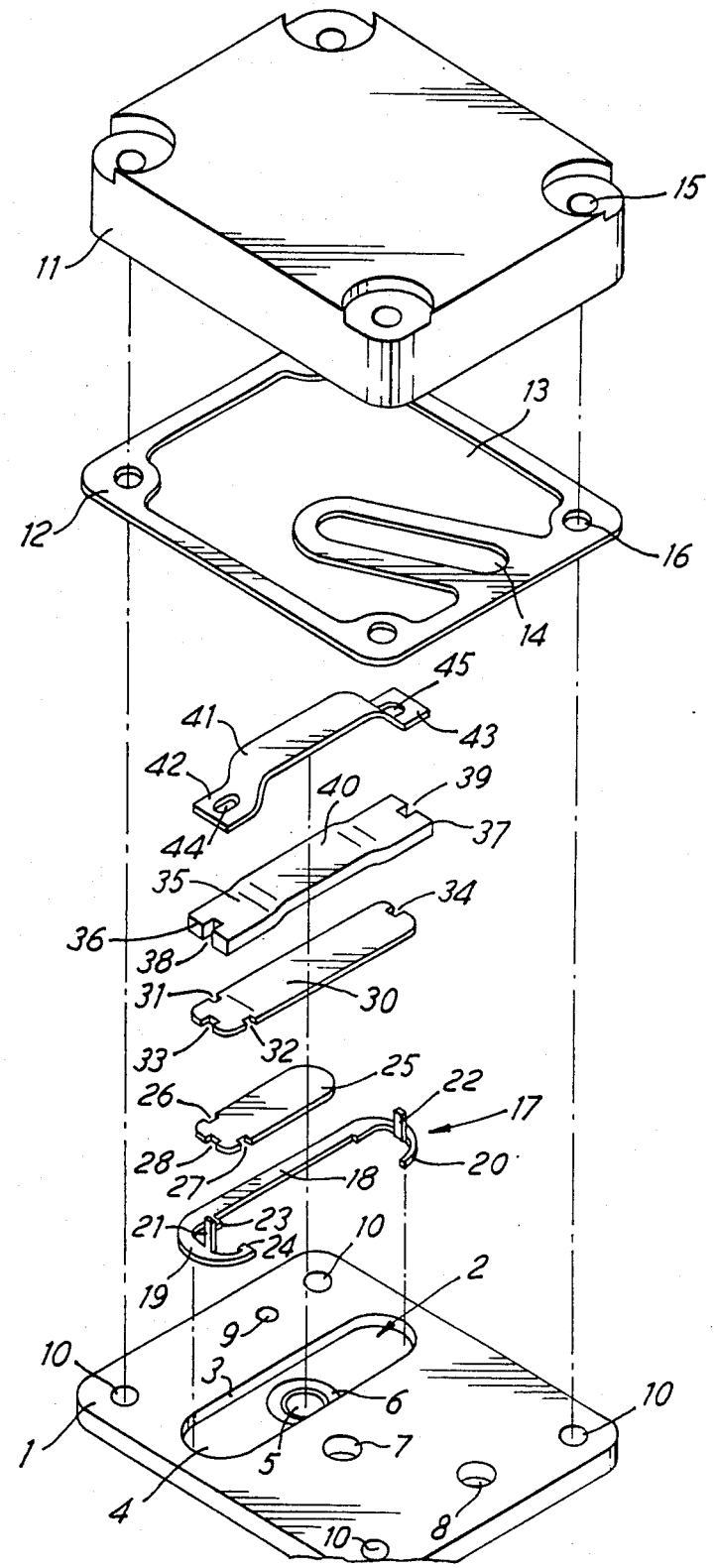

PRESSURE VALVE FOR A COMPRESSOR

The invention relates to a pressure valve for a compressor, particularly a hermetically encapsulated small refrigerator, comprising a valve plate with valve seat and upstanding pins on which at least one catch plate is placed to limit the stroke of a closing member formed by a valve leaf spring.

In a known pressure valve of this kind (DE-AS No. 15 03 406), the pins are inserted in the valve plate and are secured by the valve cover. Onto them there are pushed the valve leaf spring, the catch plate limiting its stroke and a bridge spring acting on the catch plate. For reasons of strength, the valve plate cannot have less than a particular thickness. In this way, one obtains a minimum volume of dead space in the aperture of the valve plate leading to the valve seat.

This disadvantage can be countered in that the pressure valve seat is disposed in a depression of the valve plate (DE-GM No. 69 46 784). However, it is then no longer possible to assemble the valve leaf spring, the catch plate and the bridge spring on pins and to manipulate them together because the base at the bottom of the depression is not sufficiently thick for holding the pins. On the other hand, the combination of the components is of great importance in the mass production of small compressors such as those used for hermetically encapsulated small refrigerators, because it is in this way that assembly can be simplified.

The invention is based on the problem of providing a pressure valve of the aforementioned kind possessing a smaller dead space in the aperture of the valve plate preceding the pressure valve seat.

This problem is solved according to the invention in that the valve seat is disposed in an elongate depression of the valve plate and the pins are formed on an insert sprung into the recess.

In this construction, the pins are no longer inserted directly in the valve plate but are secured on an insert which, in turn, is sprung into the depression, i.e. in the simplest case is held in the depression under friction. The pins can thereby be applied to the correct position of the depression without affecting the thin base.

In a preferred embodiment, the insert comprises a strut extending along one longitudinal side of the depression and two adjoining end sections which carry the pins, are wider than the depression in the rest condition, and are resilient widthwise. The end sections therefore lie against the walls of the depression under a slight bias. In this way, the insert can be securely held in the depression.

The end sections should be bowed. The bows can serve as resilient members.

It is particularly advantageous if the pins are made in one piece with the insert. The insert therefore requires no larger faces for securing the pins. Instead, the insert can be light in weight and be made with little material.

In particular, the insert may be a stamped sheet metal member. This gives a very cheap construction.

The stamped pins may be bent out of the plane of the sheet metal. This produces a very cheap one-piece insert.

It is also favourable for an end section of the insert to comprise two confronting projections which engage in lateral recesses of the leaf spring. This secures the valve leaf spring against longitudinal and lateral displacement even if it extends over only part of the length of the insert.

Further, the valve leaf spring may be covered by an auxiliary leaf spring, the projections likewise engaging in lateral recesses of the auxiliary leaf spring. This results in similar securing of the position as in the case of the valve leaf spring.

Further, the pins may also project from the end sections and engage in a recess at least at one end of the valve leaf spring or auxiliary leaf spring. This further improves the securing of the position.

Advantageously, the height of the insert is somewhat greater that the thickness of the at least one leaf spring. The pressure valve will then open not only as a result of bending of the valve leaf spring but also as a result of limited lifting.

The catch plate may in particular be held in abutment with the insert by means of a bridge spring clamped onto the pins. The bridge spring pushed on under a slight bias secures the assembled parts to the valve plate because the pins are connected to the insert and the latter is clamped to the valve plate.

It is also favourable for the valve plate to consists of sintered iron. This material has a natural roughness through which the adhesion of the insert in the depression is improved.

A preferred example of the invention will now be described in more detail with reference to the drawing which is an exploded view of the parts of the pressure valve.

A valve plate 1 is provided with a depression 2 having a peripheral wall 3 and a base 4. Into the latter there opens an aperture 5 surrounded by a pressure valve seat 6. The base 4 has a thickness reduced relatively to the valve plate 1 so that the dead volume of the aperture 5 is correspondingly small. The valve plate 1 also has a suction valve aperture 7, a bore 8 belonging to the suction 8, a bore 9 belonging to the pressure line and four bores 10 for the passage of securing screws. A valve cover 11 placed on this valve plate 1 with the interpositioning of a seal 12 separates a zone 13 at conveying pressure from a zone 14 under suction pressure. The holes 15 or 16 serve for the passage of securing screws.

An insert 17 comprises a longitudinal strut 18 and two bowed end sections 19 and 20. The latter each carry a pin 21 or 22. The insert 17 is a stamped sheet metal member. After stamping, the pins 21 and 22 are bent out of the plane of the sheet metal. The bows 19 and 20 are resilient and are slightly wider than the depression 2. Consequently, the insert 17 can be clamped in the depression 2 under friction. Two confronting projections 23 and 24 are provided on the end section 19.

A valve leaf spring 25 extends over somewhat more than half the length of the insert 17. At one end it has two opposed recesses 26 and 27 and an end recess 28. When the insert 17 has been arranged in the depression 2, the valve leaf spring 25 can be so inserted that the projections 23 and 24 engage in the recesses 26 and 27 whilst the pin 27 is received by the recess 28.

An auxiliary leaf spring 30 serves to provide an additional load on the valve leaf spring 25. At one end, it has recesses 31, 32 and 33 corresponding to the recesses 26 to 28 and at the opposite end a further recess 34. After assembly, the recesses 31 and 32 engage over the projections 23 and 24 whilst the recess 33 receives pin 21 and recess 34 receives pin 22. This fairly accurately positions the valve leaf spring 25 and the auxiliary leaf spring 30 in the plane of the valve plate 1.

A catch plate 35 comprises two end sections 36 and 37 each having an end section 38 or 39 and a middle section 40 that is somewhat bent up. By means of the recesses 38 and 39, this catch plate engages about the pins 21 and 22.

A bridge spring 41 has a hole 44 or 45 in each of its end sections 42 and 43. These holes are likewise pushed over the pins 21 and 22. They are dimensioned so that the spring is slightly stretched and therefore clampingly seated on the pins 21 and 22. Clamping of the bridge spring 41 on the pins and clamping of the insert 17 in the depression securely holds the parts 25, 30, 35 and 41 on the valve plate 1. The latter can therefore be manipulated during assembly without the parts of the valve falling apart.

The thickness of the insert 17 is somewhat greater than the sum of the thickness of the valve leaf spring 25 and auxiliary leaf spring 30. Consequently, in operation the valve leaf spring 25 can bend to overcome the force of the auxiliary spring 30 until it abuts the central portion 40 of the catch plate 35. In addition, the valve leaf spring 25 can be slightly displaced in height until it comes to lie against the end section 36 of the catch plate 35 that lies on the insert 17, the auxiliary leaf spring 30 being interposed.

The depression 2 is preferably produced by milling a solid plate. This provides greater strength than a different possible construction in which two plates are unified, the upper plate having a recess to form the depression. The valve plate may be of cast iron or preferably of sintered iron.

I claim:

1. A pressure valve for a compressor, comprising, a valve plate, a valve cover, a valve seal disposed between said valve plate and said valve cover, means connecting said valve cover to said valve plate, said valve plate having an elongated recess in the surface thereof in which is disposed an aperture and a surrounding valve seat, an elongated resilient insert having upstanding pins, said insert being sprung into said elongated recess, an elongated resilient leaf spring having a recess at one end thereof in which one of said pins is disposed, and an elongated catch plate for limiting the stroke of said leaf spring.

2. A pressure valve according to claim 1 characterized in that said upstanding pins are at the ends of said insert, said insert having an elongated cut-out section, said leaf spring being disposed in said cut-out section.

3. A pressure valve according to claim 1 characterized in that the end sections of said insert are bowed to facilitate mounting said insert in said recess.

4. A pressure valve according to claim 1 characterized in that said pins are made in one piece with said insert.

5. A pressure valve according to claim 3 characterized by said insert end sections have detent projections, said leaf spring having recesses in which said projections are disposed.

6. A pressure valve according to claim 5 characterized in that an auxiliary valve leaf spring covers said leaf spring, said auxiliary leaf spring also having recesses in which said projections are disposed.

7. A pressure valve according to claim 6 characterized in that said leaf spring and said auxiliary leaf spring have end located recesses in which said pins are disposed.

8. A pressure valve according to claim 6 wherein the thickness of said insert is somewhat greater than the thickness of at least one of said leaf springs.

9. A pressure valve according to claim 5 characterized in that said catch plate has recesses at the ends thereof in which said upstanding pins are disposed, and a bridge spring clamped in abutting engagement with said catch plate via said upstanding pins.

* * * * *